United States Patent
Kota et al.

(10) Patent No.: US 8,677,344 B2
(45) Date of Patent: Mar. 18, 2014

(54) SOFTWARE UPGRADE USING SINGLE SOURCE CHANNEL

(75) Inventors: Kalyana Kota, San Diego, CA (US); Utkarsh Pandya, San Diego, CA (US); Ling Jun Wong, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1145 days.

(21) Appl. No.: 12/249,638

(22) Filed: Oct. 10, 2008

(65) Prior Publication Data

US 2010/0095291 A1    Apr. 15, 2010

(51) Int. Cl.
*G06F 9/44*    (2006.01)

(52) U.S. Cl.
USPC ........... 717/173; 717/172; 717/174; 717/177; 717/178

(58) Field of Classification Search
USPC ............... 717/101–178; 709/203, 222, 227; 710/8; 725/50–51, 132; 726/2–3; 370/328; 455/417, 551, 454; 715/206, 715/238
See application file for complete search history.

(56) References Cited

U.S. PATENT DOCUMENTS

| | | | |
|---|---|---|---|
| 6,238,290 B1 * | 5/2001 | Tarr et al. | 463/40 |
| 6,557,054 B2 | 4/2003 | Reisman | |
| 7,152,110 B2 | 12/2006 | Pierce | |
| 7,512,401 B2 * | 3/2009 | Muhonen et al. | 455/414.1 |
| 7,881,745 B1 * | 2/2011 | Rao et al. | 455/551 |
| 2006/0026304 A1 * | 2/2006 | Price | 710/8 |
| 2006/0193283 A1 * | 8/2006 | Harris et al. | 370/328 |
| 2007/0288967 A1 * | 12/2007 | Candelore et al. | 725/50 |
| 2007/0288985 A1 * | 12/2007 | Candelore et al. | 725/132 |
| 2008/0071935 A1 * | 3/2008 | Ohta | 710/10 |
| 2008/0163039 A1 * | 7/2008 | Ryan et al. | 715/206 |
| 2009/0178033 A1 * | 7/2009 | Challener et al. | 717/168 |
| 2009/0320073 A1 * | 12/2009 | Reisman | 725/51 |
| 2010/0082743 A1 * | 4/2010 | Zeng et al. | 709/203 |

* cited by examiner

*Primary Examiner* — Lewis A Bullock, Jr.
*Assistant Examiner* — Francisco Aponte
(74) *Attorney, Agent, or Firm* — John J. Rogitz

(57) ABSTRACT

An automatic data downloader (ADD) causes a source device communicating with the ADD to download available software for destination devices using a single predetermined update channel. The software is received by the ADD from the source device and stored. Upon connecting to destination device that is compatible with downloaded software, the ADD sends the software to the destination device.

16 Claims, 3 Drawing Sheets example embodiment

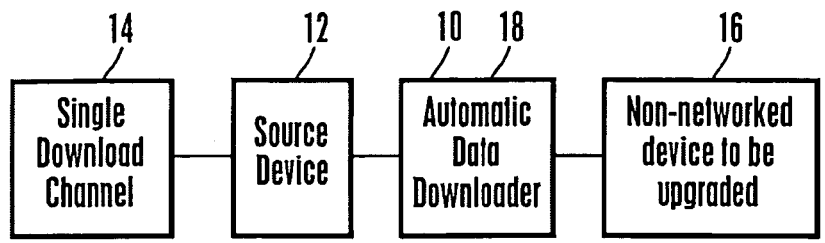
FIG. 1 general architecture
FIG. 2 example embodiment
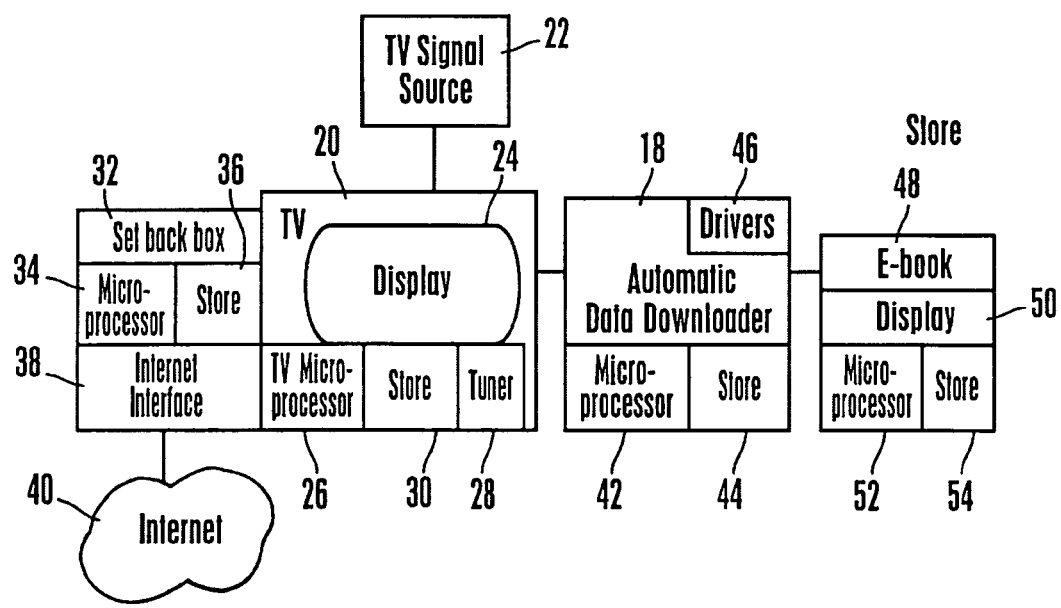
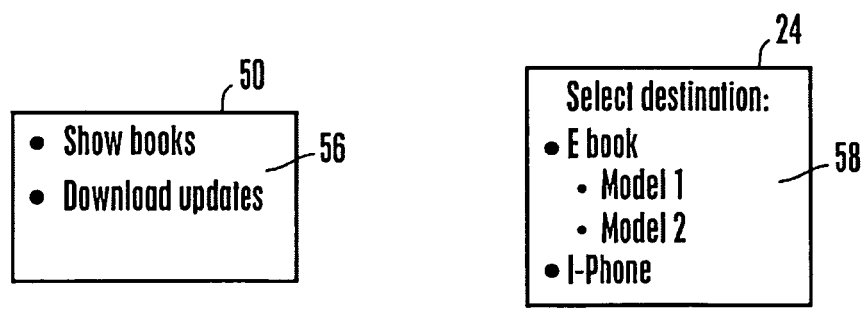
FIG. 3
example GUI-
destination device
FIG. 4
alternate GUI-
source device example logic flow

SOFTWARE UPGRADE USING SINGLE SOURCE CHANNEL

I. FIELD OF THE INVENTION

The present application is related generally to software upgrades using a single source channel.

II. BACKGROUND OF THE INVENTION

Typically, obtaining software upgrades or application downloads for a non-personal computer device such as an electronic book, game console, personal communicator such as the Mylo™, camcorder, camera, wireless telephone, etc. requires accessing web sites using a computer, which means surfing through the different web pages and looking for the correct upgrade or application for a device. This is inconvenient and limiting, because typically only the personal computer can be used. The present invention recognizes that it would be advantageous to provide simpler, more intuitive and more convenient sources for upgrades to such devices.

SUMMARY OF THE INVENTION

An automatic data downloader (ADD) includes a processor and a computer readable medium bearing instructions to cause the processor to cause a source device communicating with the ADD to download available software for at least one destination device using a single predetermined update channel. The processor receives the software from the source device and stores the software in a computer readable medium that is internal to the ADD. Then, the processor sends software stored in the computer readable medium to compatible destination devices that communicate with the ADD.

The ADD can be disconnected from the source device prior to sending software to a destination device. In some embodiments the processor checks to determine whether and what downloaded software is compatible with destination devices with which the ADD communicates, with the ADD sending compatible software to correct destination devices. If desired, the ADD can send to the source device destination device identification information.

The source device may be separate from the ADD. In any case, in example embodiments the ADD causes the source device to download software for all of potential destination devices made by a single manufacturer. The channel can be a TV channel in which case the user is not required to input an address to obtain the updates. Or, the source device is a game console or a personal communicator. The destination device may not be networked and thus may communicate only with the ADD.

In another aspect, a method includes establishing communication between an automatic data downloader (ADD) and a source device. The source device is a networked device communicating with a download channel. The method includes causing the source device to access software for a predetermined set of destination devices over the download channel and then sending the software to the ADD. The software is stored on the ADD and the ADD used to send at least some of the software to at least one non-networked destination device communicating with the ADD.

In another aspect, an automatic data downloader (ADD) includes a processor and a tangible computer readable medium communicating with the processor and storing drivers executable by the processor. The drivers includes control and adaptation information for communicating with destination devices envisioned to be upgraded and for devices envisioned for use as sources of software to be sent to the destination devices.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram showing a general system architecture that may be used;

FIG. 2 is a block diagram showing an example embodiment architecture;

FIG. 3 is a screen shot of an example graphical user interface (GUI);

FIG. 4 is a screen shot of another example GUI;

DETAILED DESCRIPTION OF THE PREFERRED EMBODIMENT

Figure 5:
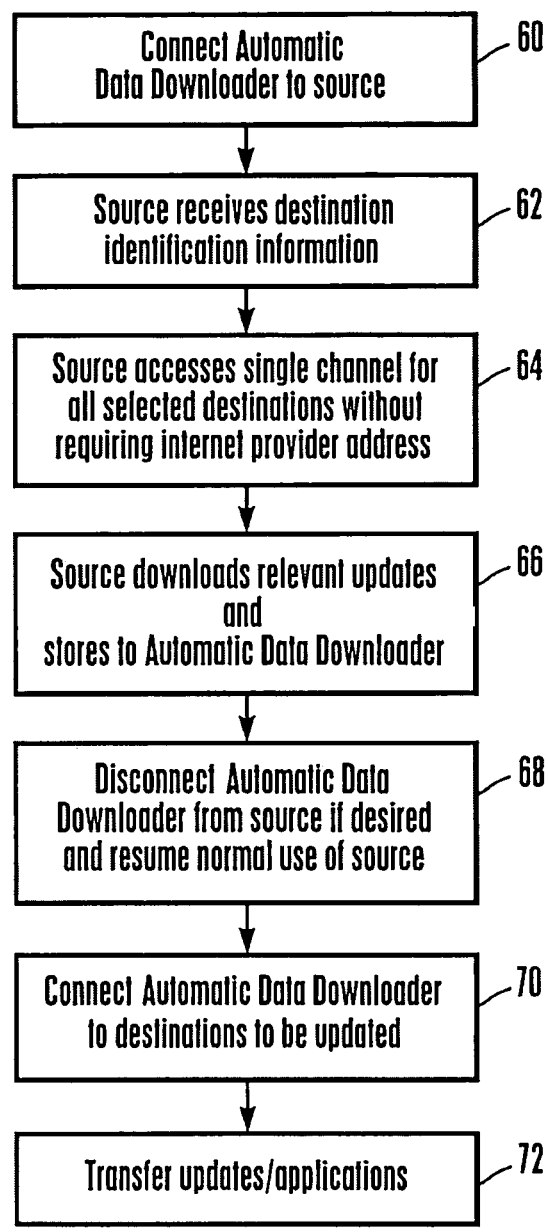
FIG. 5 is a flow chart of example logic.

Referring initially to FIG. 1, an automatic data downloader (ADD) 10 is shown that communicates with a source device 12 for receiving software updates and/or applications from a single source download channel 14. The ADD 10 also communicates with one or more destination devices 16 for sending relevant downloads from the channel 14 thereto. The ADD 10 may be contained in a standalone housing 18 as shown that is separate from the source device 12 and destination device 16, or it may be included in one of the other devices shown.

FIG. 2 shows further details of present principles using an example embodiment in which the source device is a TV 20 and the single source download channel 14 of FIG. 1 is implemented by a single TV channel from a TV signal source 22, such as a cable head end or satellite source or TV broadcast antenna. While the source device is a TV in FIG. 2, other source devices capable of network operation such as game consoles and personal communicators may be used as the source device.

In the embodiment shown, the TV 20 includes a TV display 24 such as a standard definition or high definition flat panel display or cathode ray tube. The display 24 may be controlled by a TV processor 26 communicating with a TV tuner 28. The processor 26 may access a tangible computer readable medium 30 that may be implemented by solid state, disk storage, etc. Present logic and data may be stored on the medium 30 for execution thereof by the TV processor 26.

In the example non-limiting embodiment shown, the TV processor 26 may communicate with a set-back box (SBB) 32 that can be, e.g., mounted on the rear of the TV. The SBB 32 may include a SBB processor 34, a SBB computer readable medium 36, and an Internet interface 38 such as, e.g., a modem for communicating with the Internet 40. In this way, the TV 20 may receive Internet signals for display thereof. The SBB 32 may be incorporated within the TV if desired. As well, the ADD 18 may be implemented by the SBB 32.

In the example embodiment shown, however, the ADD 18 is a standalone device. The ADD 18 may include an ADD processor 42 accessing a computer readable medium 44 that may store software-implemented drivers 46 including control and adaptation information for the destination devices envisioned to be upgraded as well as for the devices envisioned for use as sources. Such information essentially is communication compatibility information enabling the ADD to communicate with sources and destination devices and may be any appropriate communication compatibility information known in the art.

Figure 6:
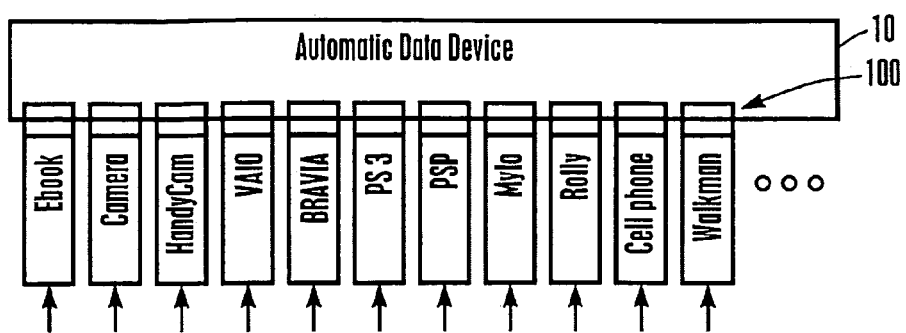
FIG. 6 is a schematic diagram of an example software architecture.

Thus, a driver 46 may be provided for each source device and each destination device made by, e.g., a single manufacturer or by multiple manufacturers but in any case each driver is configured to convey data from a source device to a destination device in accordance with principles below. FIG. 6, discussed further below, provides additional details on an example software architecture.

One such destination device may be an electronic book 48 with display 50, processor 52 driving the display 50, and computer readable medium 54 for, e.g., storing electronic book files, logic, etc. Like the media described above, the E-book medium 54 may be implemented by solid state memory or disk-based memory or other appropriate tangible computer memory.

Other destination device may be used, e.g., networked or non-networked devices such as a non-networked personal communicator, a non-networked game console, a camera, a camcorder, etc.

Using the ADD 18 and as more fully described below, consumers can easily and more flexibly download software upgrades and applications for their products, particularly though not exclusively non-networked consumer electronic devices, by means of a simpler way other than the traditional way of downloading through a computer via the Internet. With the below-described features and using the example architectures described above, consumers can upgrade their non-networked devices, by simply tuning in to any general manufacturer's collection channel (which can be on the TV or on a PlayStation or on a central website on the Internet) and select the desired software upgrade or application for their Sony devices. In this way, consumers are relieved of the chore of accessing different websites for the same purpose for different devices (because of the availability of the single source channel) and can easily perform the same task via a single hardware interface, that is through the ADD 18. Thus, the consumer no longer needs to turn on the computer, or remember any web addresses, because updates and applications can be easily and graphically accessed from a source such as the TV through the single update channel. Advantageously, in the example embodiment the source and destination devices only have to be made compatible to the ADD 18, and as set forth further below they are only responsible for pushing data onto the ADD (for the source device) or receiving data from the ADD (for the destination device). Control mechanisms in the ADD can also be used that ensure that incompatible data will not flow from the source device into the wrong destination device. For example, a software upgrade/application for a personal communicator is screened from being pushed onto another destination device such as an E-Book.

FIGS. 3 and 4 show example GUIs that can be presented to a user to facilitate obtaining upgrades and applications for a destination device. In FIG. 3, a GUI 56 can be displayed on the display 50 of the destination device shown in FIG. 2 and can include a selection "download updates". If the user selects this option, the ADD 18 is automatically instructed, without further user input such as, e.g., a website address, to cause the source device to access the single channel and obtain updates and applications for the destination device.

In contrast, FIG. 4 shows that a GUI 58 can be presented on the display 24 of the source device that can present a list of potential destination devices that are candidates for updates. The list may include various model numbers for a particular destination device as shown. The user can select which destination device(s) are to receive updates to cause the source device, without further user input such as, e.g., a website address, to access the single channel and obtain updates and applications for the selected destination device(s). Or, the user may enter (using, e.g., the keypad of a remote control) the names of destinations devices and model numbers for which updates/applications are sought.

FIG. 5 shows an example logic flow that can be used in accordance with present principles. At block 60, the ADD 10 is connected to source device 12. The source device may receive destination device identification information at block 62 by means of, e.g., one of the GUIs described above, or it may simply receive a command from the ADD 10 automatically upon sensing a connection therewith to download all available updates for each of a set of destination devices, e.g., all of the potential destination devices made by a single manufacturer.

Moving to block 64, the source device accesses the single predetermined update channel to obtain updates and software for all selected destination devices without requiring the user to input a website address as mentioned previously, although in some embodiments the user may be prompted to enter a website address. Thus, for instance, a source device that is a TV may tune to an update TV channel, or in the case of an Internet-enabled TV may access a predetermined website that is programmed into the source device as the update channel.

Relevant updates/applications are downloaded by the source device at block 66 and stored to the ADD 10. In one implementation the ADD storage 44 may be a hard disk drive that stores the updates and that is compatible (by means of the drivers 46) with both the source device and destination device(s).

The ADD 10 may then be disconnected from the source device at block 68 so that normal use of the source device may resume. The ADD 10 is then connected at block 70 to the relevant destination devices for transferring of updates/applications to the destination device(s) at block 72. The connection to the destination devices may be, without limitation, a universal serial bus (USB) connection or a wireless Bluetooth connection or other appropriate connection.

Or, the ADD 10 may be connected to destination device(s) and can check to determine whether and what downloaded updates/applications are compatible with the connected destination device(s). The ADD 10 sends compatible updates/applications to the correct destination device(s), which receive updates and automatically update their systems accordingly/incorporate applications into their systems accordingly. Failure of the ADD 10 to detect compatible devices can result in an error signal being presented on the source and/or destination device and/or the ADD itself once appropriate communication is established. The updates/applications may then be retained on the ADD 10 or removed.

FIG. 6 shows software architecture that illustrates modules in addition to the above-discussed drivers, and that exist on a higher level in the example software architecture.

As shown, the example ADD 10 can have a common Application Programming Interface 100 (API) for all devices (labeled with example names such as "Ebook", Camera", etc. in FIG. 6) that would like to connect to the ADD. In the example API, a device states how it would like the files to be transferred, what files to be transferred, error handling, and other control measures. Accordingly, instead of having the ADD adapt to all connecting devices, which could raise an unduly large number of possibilities, the connecting devices adapt to this common API. This increases the flexibility of the ADD as generic devices can also be made compatible to the ADD, which includes code for processing transfers and error checking.

At the same time, through the API 100, some security verification measures can also be implemented, such as a security key unique to a particular manufacturer, etc. This is to prevent unauthorized access to a destination device, or even the entire network of connected devices, which otherwise could be disastrous in the event of a malicious program.

In other words, owing to the common API the ADD and the attached devices need not know the proprietary code of any individual device in order to achieve compatibility for data transfer purposes.

While the particular SOFTWARE UPGRADE USING SINGLE SOURCE CHANNEL is herein shown and described in detail, it is to be understood that the subject matter which is encompassed by the present invention is limited only by the claims.

What is claimed is:

1. An automatic data downloader (ADD) comprising:
at least one processor; and
at least one computer readable medium bearing instructions to cause the processor to:
cause a source device communicating with the ADD to download available software for at least one destination device using a single predetermined update channel;
receive the software from the source device;
store the software in a computer readable medium internal to the ADD; and
send software stored in the computer readable medium internal to the ADD to compatible destination devices that communicate with the ADD;
wherein the source device is a television (TV); and
wherein the channel is a single TV channel and a user is not required to input an address to obtain the software.

2. The ADD of claim 1, wherein the ADD can be disconnected from the source device prior to sending software to a destination device.

3. The ADD of claim 1, wherein the processor checks to determine whether and what downloaded software is compatible with destination devices with which the ADD communicates, the ADD sending compatible software to correct destination devices.

4. The ADD of claim 1, wherein the ADD sends to the source device destination device identification information.

5. The ADD of claim 1, wherein the source device is separate from the ADD.

6. The ADD of claim 1, wherein the ADD causes the source device to download software for all of potential destination devices made by a single manufacturer.

7. The ADD of claim 1, wherein the destination device is not networked with the Internet, communicating only with the ADD.

8. A method comprising:
establishing communication between an automatic data downloader (ADD) and a source device, the source device being a networked device communicating with a download channel;
causing the source device to access software for a predetermined set of destination devices over the download channel;
sending the software to the ADD;
storing the software on the ADD; and
using the ADD to send at least some of the software to at least one non-networked destination device communicating with the ADD;
wherein at least one non-networked destination device is an electronic book (e-book) that includes a computer readable storage medium accessible to a processor on the e-book and bearing instructions executable by the processor to cause a user interface (UI) to appear on a display of the e-book;
wherein the UI includes at least a "show books" selector element, which if selected causes the processor to present data selectable for presentation on the display; and
wherein the UI further includes at least a "download updates" selector element, which if selected causes the processor to automatically and without further user input instruct the ADD to cause the source device to access the download channel to download software for the e-book.

9. The method of claim 8, comprising using the ADD to check to determine whether and what downloaded software is compatible with destination devices with which the ADD communicates, the ADD sending compatible software to correct destination devices.

10. The method of claim 8, wherein the ADD can be disconnected from the source device prior to sending software to a destination device.

11. The method of claim 8, wherein the ADD sends to the source device destination device identification information.

12. The method of claim 8, wherein the source device is separate from the ADD.

13. The method of claim 8, wherein the ADD causes the source device to download software for all of potential destination devices made by a single manufacturer.

14. The method of claim 8, wherein the channel is a TV channel and a user is not required to input an address to obtain the software.

15. The method of claim 8, wherein the source device is a game console or a personal communicator.

16. The method of claim 8, wherein the destination device is not networked with the Internet, communicating only with the ADD.

* * * * *